United States Patent [19]

Delatte

[11] Patent Number: 5,375,423
[45] Date of Patent: Dec. 27, 1994

[54] CRYOGENIC RESERVOIR

[75] Inventor: Daniel Delatte, Saint Maur, France

[73] Assignee: l'Air Liquide, Societe Anonyme Pour l'Etude et l'Exploitation des Procedes Georges Claude, Paris, France

[21] Appl. No.: 139,083

[22] Filed: Oct. 21, 1993

[30] Foreign Application Priority Data

Oct. 21, 1992 [FR] France .................. 92 12574

[51] Int. Cl.⁵ ............................................. F17C 7/04
[52] U.S. Cl. ............................... 62/45.1; 62/51.1; 62/48.1
[58] Field of Search ................ 62/45.1, 46.3, 48.1, 62/51.1

[56] References Cited

U.S. PATENT DOCUMENTS

| | | | |
|---|---|---|---|
| 2,900,800 | 8/1959 | Loveday | 62/45.1 |
| 2,998,708 | 9/1961 | Skinner | 62/45.1 |
| 3,030,780 | 4/1962 | Loveday | 62/48.3 |
| 3,108,706 | 10/1963 | Matsch et al. | |
| 3,782,133 | 1/1974 | Desperier et al. | 62/45.1 X |
| 4,154,364 | 5/1979 | Hagiwara et al. | 220/422 |
| 4,287,720 | 9/1981 | Barthel | 62/45.1 |
| 4,510,758 | 4/1985 | Tench, Jr. | 62/45.1 |
| 4,944,155 | 7/1990 | Alexander | 62/51.1 X |
| 5,012,102 | 4/1991 | Gowlett | 62/51.1 X |
| 5,111,666 | 5/1992 | Klok et al. | 62/48.1 |

FOREIGN PATENT DOCUMENTS

| | | | |
|---|---|---|---|
| 0193795 | 9/1986 | European Pat. Off. | 62/46.3 |
| 385061 | 12/1923 | Germany . | |
| 59-056970 | 7/1984 | Japan . | |

Primary Examiner—Christopher Kilner
Attorney, Agent, or Firm—Young & Thompson

[57] ABSTRACT

A cryogenic reservoir (1) comprising an internal reservoir (2) and an external reservoir (5) with vacuum insulation between them, is provided with a plug-valve (17) in a conduit (12) passing through the external reservoir (5). This plug valve (17) incorporates the trapping agent of the desorption gases, as a getter. In the case of accidental overpressure in the intermediate vacuum space, due to an escape of fluid from the internal reservoir (2), the "getter" is ejected to a distance with the plug valve (17), which avoids any dangerous reaction between the getter and the cryogenic fluid, which can for example be oxygen.

2 Claims, 1 Drawing Sheet

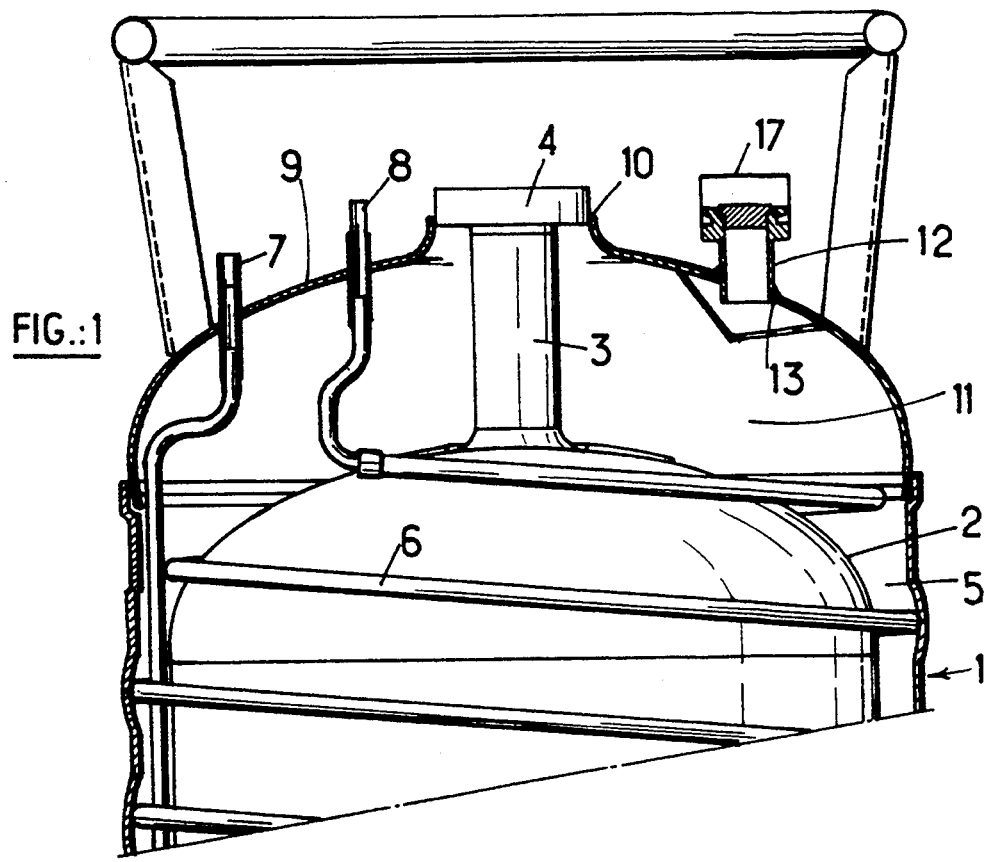
FIG.:1
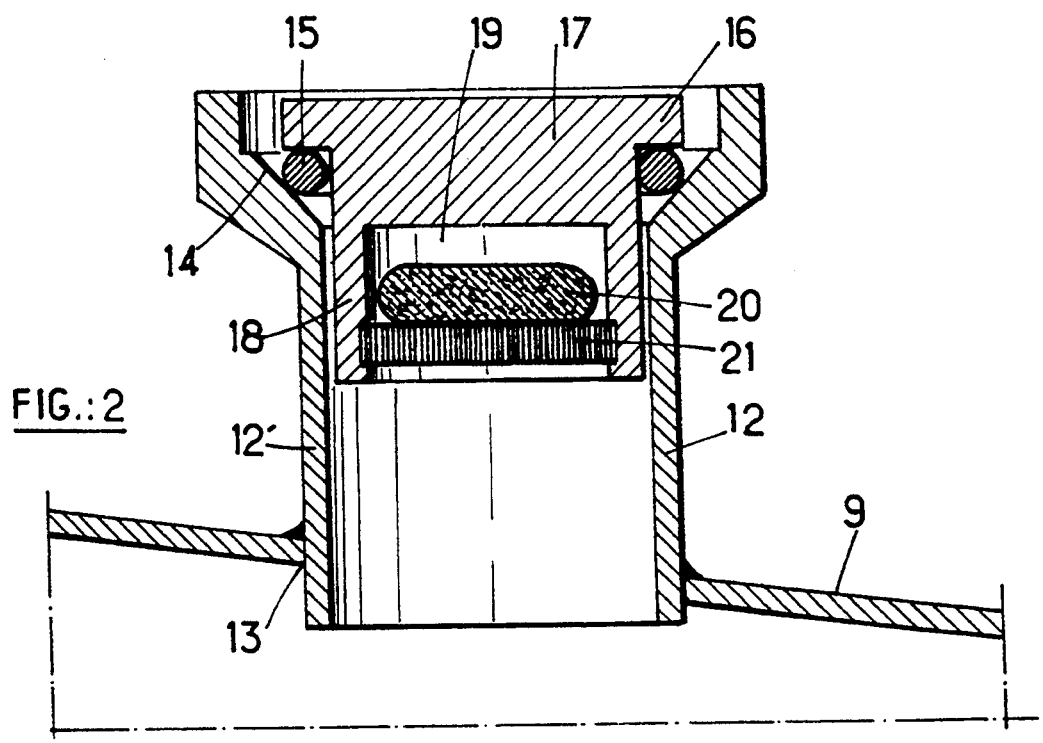
FIG.:2

CRYOGENIC RESERVOIR

The present invention relates to a cryogenic reservoir, of the type comprising an internal reservoir with a filling-emptying neck and an external reservoir forming an envelope at a distance from said internal reservoir, a conduit through said external reservoir which flares outwardly forming a seat for a joint of a plug-valve maintained in closing position by the insulating vacuum created in the intermediate space between the internal and external reservoirs, and a trapping agent for gas of the "getter" type in said intermediate space under vacuum.

The trapping agent for the gases serves essentially to maintain a satisfactory vacuum to ensure thermal insulation of the internal reservoir, while the metals forming the internal reservoir and the reservoir-envelope have a tendency to desorb certain gases, which even in very small quantity can decrease the quality of the vacuum initially established. The plug-valve serves on the one hand to close the evacuation passage of the gases after the vacuum has been established and also as a safety valve in the case of accidental overpressure in the intermediate space, which results from a loss of cryogenic fluid through the internal reservoir, which would vaporize very rapidly in contact with the warm wall of the external reservoir. In practice, the plug is then ejected a distance from the reservoir if such happens. In certain cases, however, this safety is not entirely satisfactory, because certain gases, particularly oxygen, can react with the material forming the trapping agent of the gases, giving rise to a greater or lesser risk of explosion.

The present invention has for an object a cryogenic reservoir in which such a risk is removed and this object of the invention is achieved in that the trapping agent of gas is placed in a recess of the plug-valve, which communicates with said intermediate space through a retaining wall permeable to the gases.

In this way, in case of overpressure in the intermediate space between the internal and external reservoirs, the ejection of the safety plug valve effects the simultaneous withdrawal of the trapping agent of the gases from the reactive danger zone, such that all incendiary or explosive danger from this agent is removed.

The characteristics and advantages of the invention will become further apparent from the description which follows, by way of example with reference to the accompanying drawings, in which:

FIG. 1 is a broken away view of a cryogenic reservoir according to the invention; and FIG. 2 is a fragmentary cross sectional view of a detail of FIG. 1.

Referring to the accompanying drawings, a cryogenic reservoir 1 comprises an internal reservoir 2 with a neck 3 and head 4 for reception of a device (not shown) for filling and removing cryogenic fluids. The reservoir 1 is covered with insulating and conductive layers according to the so-called superinsulation technique and is disposed in an external reservoir 5. An internal space 11, under vacuum, is provided between the reservoirs 1 and 5 and generally encloses a spiral reheating tube 6 whose ends 7 and 8 pass through the external reservoir 5 to be connected in suitable fashion to the filling-emptying device. The external reservoir 5 has an upper domed wall 9 with an opening margin 10 which is sealingly welded about the filling-emptying head 4.

Through the wall 9 extends a tubular member 12 welded about an opening edge 13 of the wall 9 of the external reservoir 5, this member 12 having at its external end a truncated conical shape flared outwardly at 14, serving as a receiving seat for an O-ring 15, against which is applied the enlarged peripheral edge 16 of a plug-valve 17 having a body 18 engaged with play in the tubular member 12 and having an internal recess 19 opening through the side of the external reservoir 5, and which serves as a housing for a "getter" disc 20 resting on a removable permeable wall of porous material or a simple grill 21.

The emplacement of the plug-valve 17 provided with the "getter" disc 20 and the porous wall or grill 21 is effected by first connecting a vacuum creating device about the tubular member 12, with means for maintaining the plug-valve 17 in position substantially disengaged from the seat 14, the body of the valve 18 being itself then disengaged from the body 12' of the tubular piece 12. The pumping can then take place, and once a vacuum of about 0.13 to 0.013 Pa is achieved, the plug-valve 17 is first replaced in closing position with the peripheral edge 16 bearing freely via the O-ring 15 on the seat 14. After this, the vacuum is "broken" from the outside of the plug-valve 17, which serves to ensure sealing pressure on the O-ring 15.

The insulating vacuum necessary between internal and external reservoirs 2 and 5 is thus finally established and maintained by the trapping of the gases desorbed, by the getter 20.

In case of accidental escape from the internal reservoir 2, the escaped cryogenic liquid vaporizes very rapidly in contact with the warm wall of the external reservoir 5, and gives rise to an abrupt rise of pressure in the initially evacuated space 11, which has the effect of ejecting to a distance the plug valve 17 incorporating the getter disc 20. As this phenomenon is rapid, there is avoided any dangerous reaction of the cryogenic liquid with the material comprising the "getter".

The described reservoir is used to contain cryogenic fluids and particularly reactive fluids, such as oxygen.

What is claimed is:

1. A cryogenic reservoir comprising an internal reservoir (2) with a filling-emptying neck (3), an external reservoir (5) forming an envelope spaced from said internal reservoir (2), a conduit (12) extending through the external reservoir (5) and comprising an outward flaring providing a seat (14) for a sealing ring (15) of a plug valve (17) maintained in a closed position by an insulating vacuum created in an intermediate space (11) between the internal and external reservoirs (2 and 5), and a gas trapping agent in the intermediate vacuum space, wherein the trapping agent (20) is disposed in a recess (19) of the plug-valve (17) which communicates with said intermediate space through a retaining wall (21) permeable to the gases.

2. A cryogenic reservoir according to claim 1, wherein the retaining wall (21) is a grill.

* * * * *